(No Model.)

F. WREDE.
GLASS MELTING TANK OVEN.

No. 517,675. Patented Apr. 3, 1894.

Witnesses
Chas. H. Smith
Harold Ferrel

Inventor
Friedrich Wrede
per Lemuel W. Serrell
Atty.

THE NATIONAL LITHOGRAPHING COMPANY,
WASHINGTON, D. C.

UNITED STATES PATENT OFFICE.

FRIEDRICH WREDE, OF DRESDEN, GERMANY.

GLASS-MELTING TANK-OVEN.

SPECIFICATION forming part of Letters Patent No. 517,675, dated April 3, 1894.

Application filed June 23, 1893. Serial No. 478,565. (No model.) Patented in Germany October 22, 1891, No. 67,505.

*To all whom it may concern:*

Be it known that I, FRIEDRICH WREDE, a subject of the King of Prussia, residing at Dresden, in the Kingdom of Saxony, German Empire, have invented a new and useful Improvement in Glass-Melting Tank-Ovens, (for which Letters Patent have been granted to me in Germany under date of October 22, 1891, No. 67,505,) of which the following is a specification.

In the process of melting and working glass in tank ovens or furnaces it has been found advantageous to make the operation continuous, the crude material being supplied at one end of the tank and the refined glass being worked out at the other end. In carrying out such process the crude and lighter materials have been kept at one end of the tank and away from the working out end by transverse floating bridges which extended partially down into the fused material, the same causing the melted and purest glass as it sank to the bottom to pass beneath the bridges into the working out end as the glass therein was removed. I have discovered that the quality of the glass is improved by protecting the molten glass at the working end from the direct action of the flame of the furnace. This also protects and facilitates the action of the materials that have been added to the glass to cause the same to become colorless and provides for a cleaner melting operation and for obtaining the molten glass less hot and less liquid directly at the working out end, and I have discovered that especially in the manufacture of colorless glass it is necessary to provide means for decreasing the direct and long continued action of the flame on the molten glass, and the object of my invention is to keep off the direct flame from the molten glass at the working out end.

In carrying out my invention I employ a number of bridges and connecting covering plates which partially or completely cover over the molten glass to the desired extent at the working out end of the tank furnace. These bridges may float upon the molten glass in whole or in part or they may be secured in the walls of the furnace and be made as arch bars and the covering plates may be flat or curved. These bridges are made of a refractory material such as fire brick.

Figure 4:
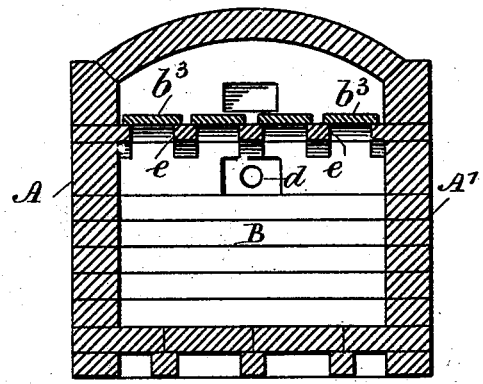
Figure 3:
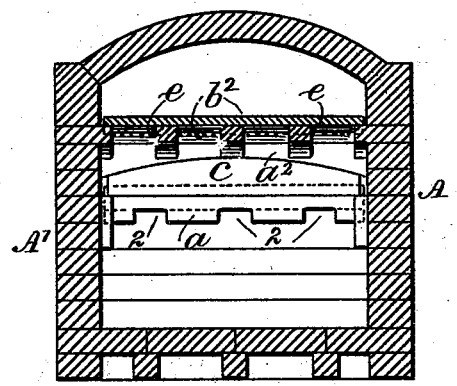
Figure 1:
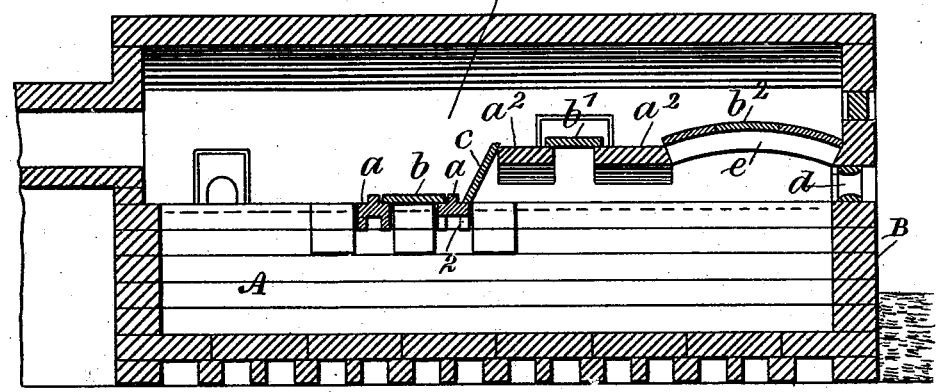
Figure 2:
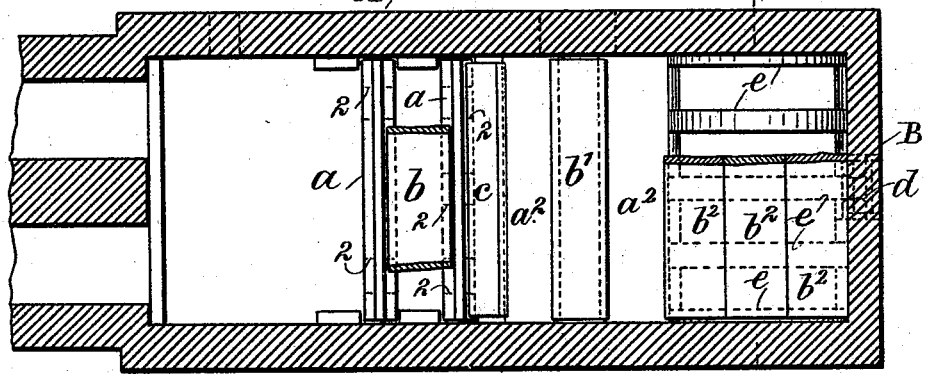

In the drawings, Figure 1 is a vertical longitudinal section of my improved tank glass furnace. Fig. 2 is a sectional plan. Fig. 3 is a cross section taken at the line $x\,x$ of Fig. 2 looking toward one end of the tank furnace, and Fig. 4 is a cross section also upon the line $x\,x$ of Fig. 2 looking toward the other end of the tank furnace and showing the covering plates arranged in another direction.

These bridges or beams may be solid in cross section or they may be of ∩, T or other form suitable for the purpose; they may be arranged in the oven or furnace each closely adjacent to each other, so that the surfaces of the beams or bridges form the protection to the surface of the melting materials at one end of the furnace against the direct action of the flame; or they may be arranged at certain distances apart from each other, in which latter case the intermediate spaces between them may be partly or entirely covered by connecting plates $b.\,b'$. The manner in which these bridges or beams are situated or arranged may vary, but I prefer to arrange them transversely in the tank furnace and I prefer to make these bridges of a refractory material such as fire brick. These bridges may either float freely on the fused material or be supported and held in recesses in the side walls A. A'. of the tank furnace, and some of said bridges may be arranged to rest permanently in the side walls above the fused material in the tank, or if floating, said bridges may rest or be guided in either permanent or movable sockets according to the level of the molten or fused material. These bridges or beams $a$ whether arranged to float or to rest while dipping into the molten material or arranged in part above the molten material, are preferably placed at a distance apart from each other and covering plates $b\,b'$ are added. If said bridges are arranged to float, they are preferably provided with longitudinal ribs on their upper surfaces, so as to offer a hold for the covering plates $b.\,b'$. The bridges, if dipping into the molten material, may in their submerged parts be provided with openings or notches 2, so as to allow the fused material to flow at or near the surface from the melting end to the other or working end; these openings may be arranged in alternate positions so as to increase the space for the fused material at or near the surface from one end to the other within the tank.

If floating bridges or beams and permanent bridges $a^2$ are together used in combination in a tank furnace, as illustrated in the drawings, means must be provided to close up the space below the permanent bridges; this may be done by one or more slanting connecting plates $c$ which rest on one of the floating bridges or beams $a$ and against the adjacent permanent beam or bridge $a^2$. Such a slanting plate $c$ may extend from the last permanent bridge to the end wall B. of the tank furnace in which the working opening $d$ is provided, or permanent arch bars $e$ may here be built, as shown in the drawings. The covering plates $b^2$. $b^3$. are placed upon the arch bars $e$ either transversely of the tank furnace and at right angles to the bars $e$, as shown in Figs. 1, 2 and 3, or parallel with the bars $e$, as shown in Fig. 4.

For constructing the bridges or beams any refractory material may be used which proves to be neutral against the melting or molten mass. By the means herein specified the pollution of the molten mass by the products of combustion of the flame is prevented and also the decomposing action of the flame upon the materials added to the glass to make the same colorless will be prevented, and the reducing action of the flame is decreased, which features are essential in melting glass in such tank furnaces.

I claim as my invention—

1. The combination with a tank glass furnace, of a floating bridge having a downwardly projecting rib or flange with openings through the same for the passage of the melted glass, substantially as specified.

2. The combination with a tank glass furnace, of two or more floating bridges and covering plates between and resting on such bridges and covering the molten glass to exclude the products of combustion from the same at the working end of the tank furnace, substantially as specified.

3. The combination with a tank glass furnace, of two or more transverse floating bridges, two or more elevated bridges, horizontal covering plates and an inclined connecting plate, said parts covering the molten glass to exclude the products of combustion from the same at the working end of the tank glass furnace, substantially as specified.

4. The combination with a tank glass furnace, of two or more transverse floating bridges $a$, two or more elevated bridges $a^2$, horizontal covering plates $b$ $b'$ $b^2$, an inclined connecting plate $c$ resting upon one floating bridge and against one elevated bridge, and the arch bars $e$, said parts covering the molten glass to exclude the products of combustion from the same at the working end of the tank glass furnace, substantially as specified.

In testimony that I claim the foregoing as my invention I have signed my name in presence of two subscribing witnesses.

FRIEDRICH WREDE.

Witnesses:
CARL KNOOP,
WILHELM WIESENHÜTTER.